United States Patent [19]

Olivier et al.

[11] Patent Number: 5,201,128
[45] Date of Patent: Apr. 13, 1993

[54] MINIATURE GIMBAL MOUNTED MAGNETIC FIELD DETECTORS

[75] Inventors: André W. Olivier, New Orleans; Walter L. Heston, Arabi, both of La.

[73] Assignee: The Laitram Corporation, New Orleans, La.

[21] Appl. No.: 749,324

[22] Filed: Aug. 23, 1991

[51] Int. Cl.$^5$ .............................. G01C 17/18
[52] U.S. Cl. ........................... 33/355 R; 33/357; 33/310
[58] Field of Search ............. 33/355 R, 308, 310, 33/354, 356, 357, 391, 397

[56] References Cited

U.S. PATENT DOCUMENTS

| | | | |
|---|---|---|---|
| 499,087 | 6/1893 | Baker | 33/356 |
| 1,270,178 | 6/1918 | Lehtinen | 33/355 |
| 1,556,557 | 10/1925 | Paemelaere | 33/355 R |
| 1,732,335 | 10/1929 | Iverson | 33/391 |
| 3,727,177 | 4/1973 | Fuller et al. | 33/397 |
| 3,769,710 | 11/1973 | Reister | 33/355 |
| 3,927,474 | 12/1975 | Lapeyre et al. | 33/356 |
| 4,250,626 | 2/1981 | Lazar | 33/355 R |
| 4,359,823 | 11/1982 | White | 33/355 R |
| 4,471,534 | 9/1984 | Fowler | 33/355 R |
| 4,796,365 | 1/1989 | Hudson | 33/356 |

Primary Examiner—William A. Cuchlinski, Jr.
Assistant Examiner—C. W. Fulton
Attorney, Agent, or Firm—Laurence R. Brown; James T. Cronvich

[57] ABSTRACT

A miniaturized electronic magnetic compass system, or the like, is mounted in a substantially cylindrical gimbal ring unit of about 0.75 in diameter, and 1.25 in length. Critical to the small size is the pendulum that positions the internal magnetic detector by gravity relative to the earth's surface. Thus, a pendulum formed of tungsten has its curved bottom surface formed of a central spherical surface and two flanking cylindrical surfaces meeting in two planes disposed at an angle intersecting with the pendulum axis of rotation. The mass of the detector is centered by resilient conductive spring plates bearing on gimbal pivot shafts, which also serve as electrical connectors for the detector. Thus, two separated shaft ends journalled in one gimbal ring, which is insulated to electrically isolate the shaft ends serve as two conductors. The gimbal system is damped in a perfluorocarbon oil. An outer cylindrical housing member removably envelops the gimbal system in a shock absorbing mount produced by rubber-like sealing members. an outer roll sensing coil is wrapped about a channel indented in opposite sides of the outer housing member. The housing members are grounded so that only one signal path is extended internally through the conductive spring plates.

26 Claims, 3 Drawing Sheets

MINIATURE GIMBAL MOUNTED MAGNETIC FIELD DETECTORS

TECHNICAL FIELD

This invention relates to level-seeking magnetic field detection instruments for relating the ambient magnetic field to the local gravitational vector with a pendulum reference biasing member mounted in a gimbal assembly, and more particularly it relates to magnetic compasses for detecting ambient magnetic fields in the presence of dynamic movements with respect to the surface of the earth such as encountered in towing detectors through seawater in hydrophone streamer cables performing acoustic measurements.

BACKGROUND ART

It has been difficult in the prior art to miniaturize dynamic position responsive compasses, and the like, which depend upon a pendulum for establishing the horizontal plane of the earth's surface in the presence of dynamic movements of the instrument. The pendulum itself is a limiting factor in the miniaturization because of critical shape, mass, friction, etc. that relate to instrument accuracy and response time when dynamically moving under such conditions as when being towed in rough water behind a vessel.

In magnetic detection instruments, miniaturization itself is otherwise advantageous in that larger size bodies surrounding a magnetic detector provide more possibilities of stray magnetic field patterns that produce noise and limit accuracy. Thus, smaller size eliminates some sources of magnetic noise disturbances that can reduce sensitivity or accuracy, which may be found in surrounding electronic circuit wiring, any movable conductive materials and certain types of materials including some classes of ceramics that react magnetically.

Instrument accuracy and sensitivity is critical, such as for response of electronic magnetic compass systems to very subtle changes in the earth's magnetic fields caused by geological structures or to motion of a streamer cable in rough seas. Dynamically operable magnetic field detectors are essential to precisely measure the local magnetic field, and need to respond quickly, particularly when used in air or sea vessel surveys. One limiting response time deterrent is the necessity to use a pendulum, which may be large enough to have considerable inertia and thus may limit the dynamic response time under quickly changing positions encountered for example in rough seas, etc. Also pendulum movement can cause magnetic noises in various ways.

In any instrument involving a gimbal assembly, there are potential gimbal-related inaccuracies because of friction, inertia, mechanical misalignments, bearing wear, shifting of masses under dynamic conditions, etc. These introduce special problems that are critical to instrument accuracy.

The housing environment of such instruments is also critical, and can introduce dynamic shock-induced inaccuracies as well as magnetic field disturbances and reliability in use under various environmental conditions, such as sea water. The distribution of mass and weight of the instrumentation is also critical in this respect.

One significant problem has been establishing electrical communications or wiring to eliminate noise disturbances and to handle very low level signals under the dynamic signal and environmental working conditions that are encountered. This is particularly difficult to resolve wherever movable parts are involved because of stray currents, impedance changes in contact points with wear, magnetic fields, and different positional performance.

Accordingly, in the prior art there has not been satisfactory reliable and accurate level-seeking magnetic field sensing instrumentation, particularly in miniature, and especially for use in magnetic compass systems. It is therefore the primary object of this invention to provide improved instrumentation for overcoming the various aforesaid defects of the prior art.

DISCLOSURE OF THE INVENTION

A miniaturized magnetic field sensor instrument for an electronic compass system embodiment of the invention is contained in a cylindrical titanium outer housing of a diameter about 2.2 cm (0.85 in) and a length about 12.7 cm (5 in). This contains a removably insertable instrument unit contained in a further cylindrical housing along with other system electronics to operate as a compass system that is well suited for towing behind a vessel in a hydrophone streamer array.

Miniaturization is made feasible for the magnetic field sensor, which is mounted on a flat ceramic electronic circuit substrate acting as a sensor platform and referenced to the earth's gravitational vector by means of a novel pendulum formed as a central section having spherical bottom curvature and a pair of identical flanking sections having cylindrical bottom curvature, which meet along planar interfaces disposed at an angle intersecting the rotation axis of the pendulum. The pendulum is made of tungsten.

Horizontal-leveling of the plane of the substrate is achieved by a gimbal ring assembly which provides electrical insulation for isolation of two halves of a critical gimbal ring. Journalled therein are two shaft ends permitting rotation of the substrate in the gimbal ring. This structure permits the shaft ends to be used as circuit connectors by way of leaf spring plates bearing on each shaft end for the dual purpose of electrical connection and for retaining the mass of the circuit substrate in its centered balanced position. Ceramic ball bearings journal the pivot shafts in the gimbal ring. This novel structure confines electrical current to the pivot shaft ends without stray leakage paths to prevent deterioration of the journal bearings and any signal losses or introduction of noise.

Other features, objectives and advantages of the invention will be found throughout the following description, drawings and claims.

BRIEF DESCRIPTION OF THE DRAWINGS

In the drawings, wherein like reference characters identify similar features in the various views to facilitate comparison.

THE PREFERRED EMBODIMENTS

Figure 2:
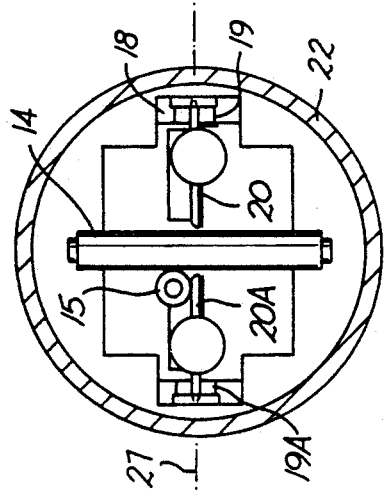
FIG. 2 is an end section diagrammatic sketch of the detector unit of FIG. 1 taken looking into lines 2—2.
Figure 1:
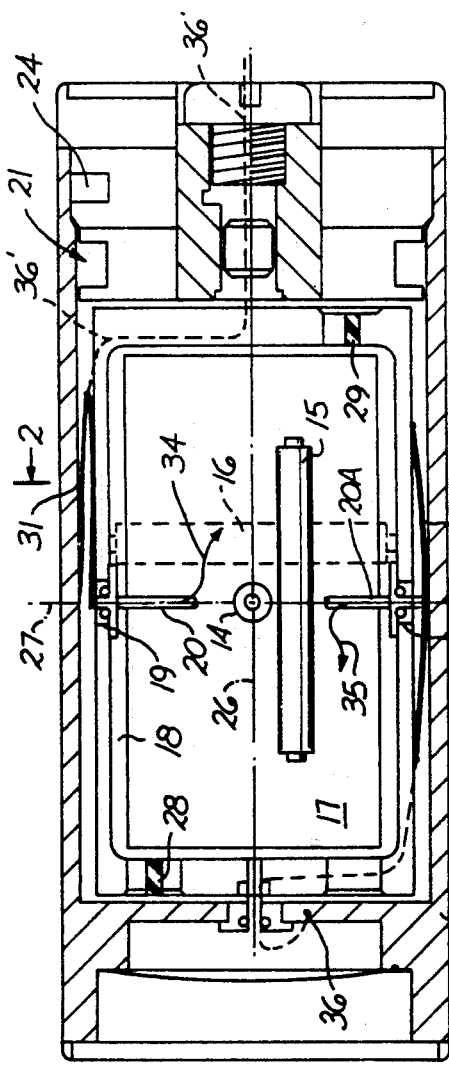
FIG. 1 is a section view diagrammatic sketch of a magnetic compass detector unit embodiment of the invention, miniaturized in substantially cylindrical configuration.
Figure 3:
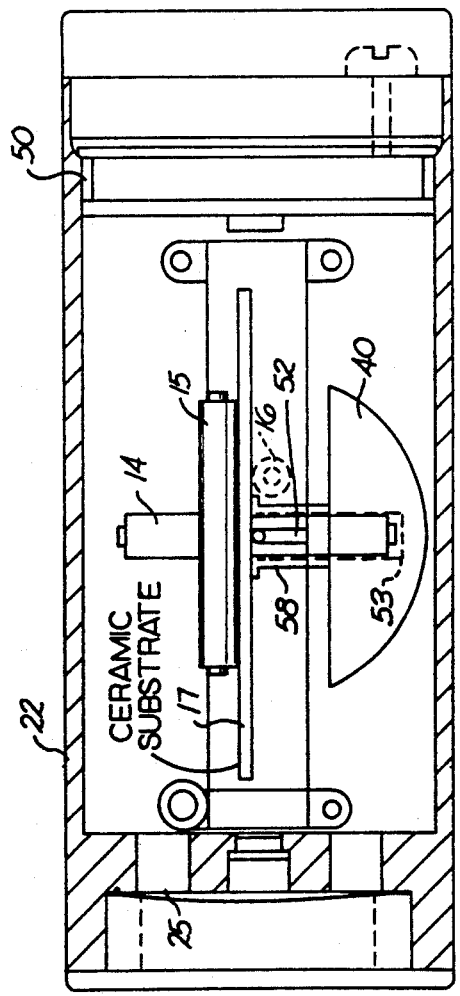
FIG. 3 is a section view diagrammatic sketch of the detector unit of FIG. 1 with the electronic circuit substrate rotated 90 degrees to show the operating position of the pendulum.

Reference is now made to the level-seeking magnetic field detector embodiment of the electronic compass of the invention as set forth in FIGS. 1 to 3, wherein a gimbal ring system maintains the spatial orientation of normally disposed magnetic sensors 14, 15, 16. The detectors 14, 15, 16 are mounted on a ceramic substrate 17. One of the sensors 14 is mounted normal to the plane of the substrate 17 through a central hole. The ceramic is a non-magnetic circuit board type of ceramic that has a low coefficient of thermal expansion. The substrate 17 rotates in gimbal ring 18, by means of shaft ends 20, 20A journalled by ball bearing races 19, 19A. Other supporting electronic circuitry (not shown) for the magnetic sensors 14, 15, 16 is mounted on the substrate 17 in balanced position about two axes of rotation 26, 27. In this way, the destabilizing effects of electronic components with different thermal expansion properties are reduced.

The outer cylindrical member 22, which supports the gimbal assembly and is in essence part of the outer gimbal ring completed by the removable plug portion 21, is preferably made of titanium for light weight, machinability, strength, and non-magnetic properties. Typical miniaturized outer cylinder diameter is between 1.8 cm (0.7 in) and 2.0 cm (0.8 in) and the length falls between 2.5 cm (1 in) and 3.8 cm (1.5 in). Such miniaturization is made possible by means of the improvements of this invention found throughout the following description.

The inner gimbal ring 18 and associated assembly is removably held in place inside cylinder 22 by means of screws or pins 24 in precise coaxial alignment with the gimbal roll axis 26. The assembled cylindrical detector unit is sealed to confine a surrounding damping and lubricating liquid, preferably a perfluorocarbon, such as perfluoroperhydrofluorene, or silicon oil of a viscosity in the range of 1cSt to 10cSt[1]. This fluid is selected for dielectric properties and low thermal expansion, chemical inertness, good lubricating qualities, density for proper buoyancy, and proper damping viscosity. Also, sealing members 25, 50 are provided of an expandable elastic constituency, such as by a polymer-based diaphragm, to respectively absorb axial and bending moment shock imposed upon the gimbal system under dynamic work conditions.

[1] 1cSt (centistoke)=1 mm$^2$/s.

It is pertinent that two shaft ends 20, 20A are affixed by the respective end portions to the ceramic substrate 17 in exact alignment with the gimbal pivot pitch axis 27 of the gimbal ring 18 as a complete shaft and thereafter the center portion is removed to electrically insulate and isolate the two end portions 20, 20A. Otherwise to align two separate shafts and affix them in alignment on the ceramic substrate 17 is a formidable task. The similarly electrically isolated metallic gimbal ring 18, upper and lower halves are separated by insulator sections 28, 29 interposed for electrical insulation and isolation of the two bearing races 19 and 19A.

Figure 11:
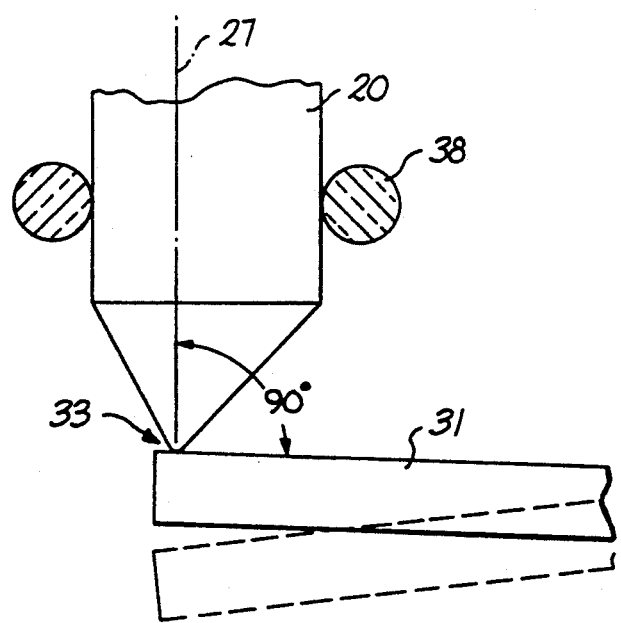
FIG. 11 is a fragmental, enlarged sketch showing the end structure of the shaft and accompanying mount features as provided by this invention.

The shaft ends therefore can act as electrical conductors and connectors for the electronic circuitry on the substrate 17, in contact with the respective leaf spring plates 31, 32. As shown in enlarged form in FIG. 11, in stable position, the spring plate 31 is cantilevered and disposed preferably at a 90 degree angle to the common axis of the gimbal ring and shaft end 20. Leaf spring plate 32 is not cantilevered, but is attached at both ends to the gimbal ring 18 at two points straddling the shaft end 20A, thereby biasing the substrate platform and its other shaft end 20 against the cantilevered leaf spring 31. These spring plates 31, 32 serve the dual purpose of electrical contact at a low friction point of contact 33 and to provide a resilient bias that centers the mass of the substrate 17 to resist movement along the shaft 20 axis 27.

The electronic system is distributed on the substrate 17 to balance about the two axes of rotation 26, 27 in the gimbal ring. This prevents unequal thermal expansion rates of the various components of the electronic system from destabilizing the balanced substrate. The leaf or plate spring material is chosen for long wear life, good electrical contact, non-corrosiveness, low coefficient of thermal expansion, and proper elastic properties. Thus, beryllium copper is preferable, and it may be plated with a noble metal such as gold to improve electrical contact, reduce corrosion and assure low friction.

In the electrical circuit, one spring plate, 32, forms part of the signal path through the common-referenced cylindrical case as indicated by path 36. The other spring plate, 31, is affixed adjacent the upper half of gimbal ring 18 as shown in FIG. 1 and forms part of the return signal path, indicated by path 36'. A conductor lead is carried externally through the end of the housing (in a manner not shown) for conveying signals from the magnetic sensors 14, 15, 16 and to communicate operating signals or currents, as required. Internally the leads 34, 35 respectively connect with the electronic circuit on the substrate 17.

Because of the electrical currents through the shaft ends 20, 20A, the journalling in the metallic gimbal ring 18 is critical in the presence of small signal levels and long time wear and operating consistency. The insulated portions 28, 29 of the gimbal ring 18 isolated the journals 19, 19A, so that they could be conductive. However, if even very small currents flow or are diverted because of stray paths, or eddy currents are introduced, etc., any current flow into or out of the bearing could damage the journalling and cause unwanted friction and wear and furthermore could reduce signal accuracy. Thus, as seen from FIG. 11, the balls 38 in the ball races 19 are ceramic insulators, preferably silicon nitride. The typical diameter of these balls 38 ranges between 0.04 cm (0.017 in) and 0.08 cm (0.030 in) for shaft diameter ranges of 0.06 cm (0.025 in) to 0.09 cm (0.035 in) employed with this invention.

Now with particular reference to FIGS. 2, 3, 8, 9 and 10, the novel features of the pendulum 40 afforded by this invention will be reviewed. The pendulum is critically related to the reduced size of the detector and accompanying cylinder 22 diameter, as afforded by this invention. Thus, tungsten is used as a non-magnetic material with high density and the pendulum is critically shaped for optimized righting moment performance in a small diameter gimbal mount.

As seen in FIG. 3, the pendulum system of the invention comprises a pendulum 40 and a pendulum arm 58 extending from the top surface of the pendulum 40 and attached to the substrate 17. The arm is hollow to accommodate a portion of the vertical sensor 14. The pendulum 40 also has a hollow formed in it in registration with the hollow shaft for a longer sensor 14. The arm 58 further defines a slot 52, which breaks the closed loop that would be formed by the hollow arm if it were not slotted. Importantly, the broken loop serves to eliminate induced currents in the arm that would otherwise affect sensor magnetic performance. The hollow in the pendulum and its slotted arm to accommodate the sensor 14 without the harmful effects of induced eddy currents in pendulum structure is critical to the miniaturized three-sensor embodiment of the invention.

Figure 8:
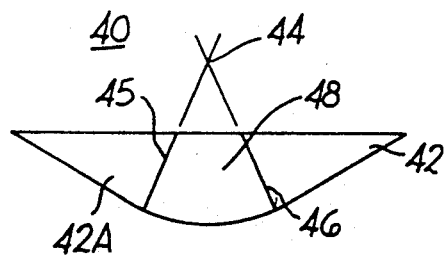
FIG. 8 is a side view sketch showing the sections out of which the pendulum is formed.

As seen in FIG. 8, the critical shape of the pendulum 40 is defined by three portions, a central portion 48 and a pair of identical flanking portions 42, 42A. The central portion 48 meets the flanking portions 42, 42A at interface surfaces 46 and 45. In the preferred embodiment, the pendulum is cut from a single piece of tungsten, so that the interface surfaces are imaginary and only important for geometrical description of the pendulum 40.

Figure 9:
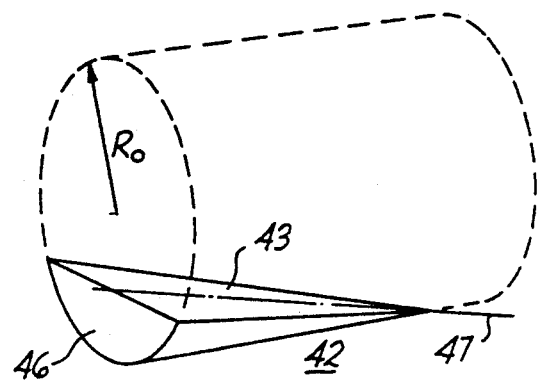
FIG. 9 is a perspective view sketch of the flanking sections of the pendulum of FIG. 8.
Figure 10:
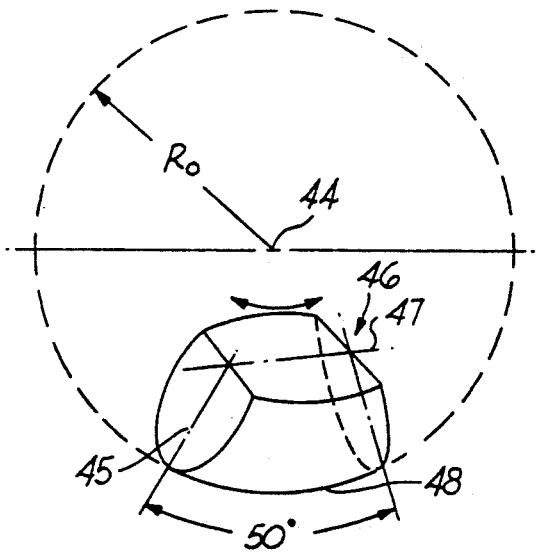
FIG. 10 is a perspective sketch of the central section of the improved pendulum provided by this invention, with an accompanying chart related to dimensional characteristics of the pendulum.

The resulting pendulum 40 pivots about axis 44, which in this case is also the substrate pivot pitch axis 27 common with the axis of gimbal ring 18. (The pendulum 40 also pivots about an axis normal to axis 44. The normal axis is, in this case, the roll axis 26 of the substrate pivot.) Thus, the pendulum has the shape shown in FIG. 8 with the two planar interface surfaces 45, 46 lying in planes that intersect with the axis of pitch rotation 44 of the pendulum 40. The central pendulum section 48 is balanced about both its pivot ar (not shown) and the axis of curvature 47 as seen in FIG. 9. The lower curvature shape looking into the planar surface 46 is substantially cylindrical. However, as seen from FIG. 10, the shape about the pivot axis 44 is spherical as related to the circle of radius $R_o$. Thus, the subtended angle indicated by double headed arrow 49 is 50 degrees, related to an angular departure of 25 degrees from vertical of each planar interface surface 45 and 46 for a preferred embodiment of this invention. Each of the flanking sections 42, 42A, shown in detail in FIG. 9, is a portion of a right circular cylinder having the same radius Ro as the sphere of FIG. 10. The portion 42 is defined by a plane intersecting the cylinder and containing the upper surface 43 of the flanking section 42. Thus, the surface 46 of the flanking section 42 is identical to the surface 46 of the central portion of FIG. 10. The pendulum 40 made of these combined shapes maximizes the righting moment for both pitch and roll rotation in the miniature cylindrical sensor housing the invention.

Figure 4:
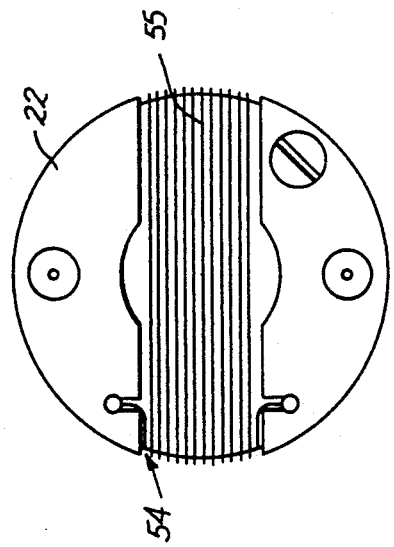
FIG. 4 is an end view of the cylindrical outer surface of the detector unit showing an outer roll detector coil wrap lodged in a groove about the outer surface.
Figure 5:
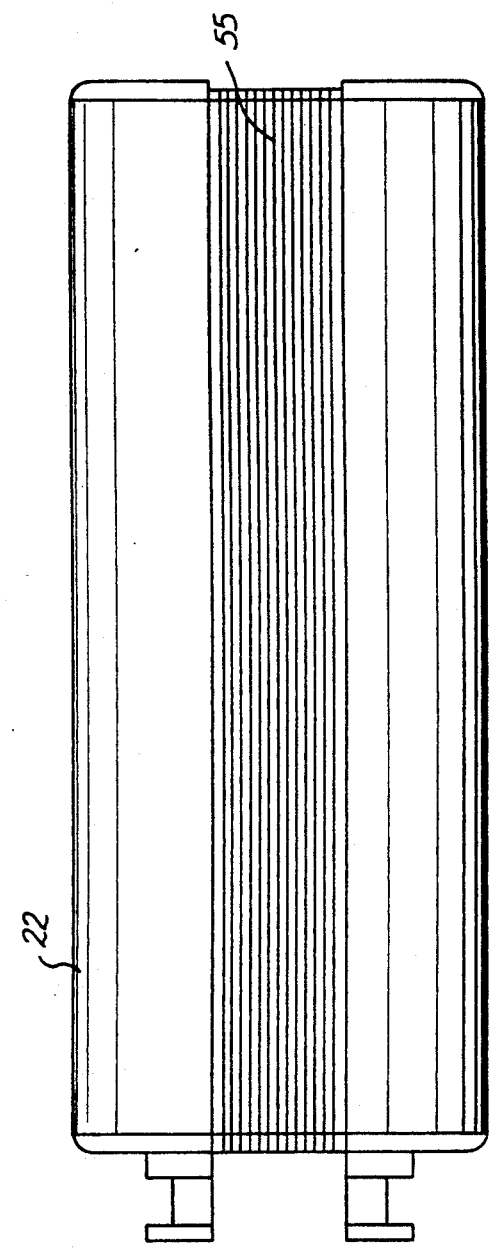
FIG. 5 is a side assembled view of the detector unit outer surface and roll coil in place in its groove.

As seen from FIGS. 4 and 5, the generally cylindrical gimbal housing 22 has grooves 54 axially down opposite sides for receiving the roll detection coil 55.

Figure 6:
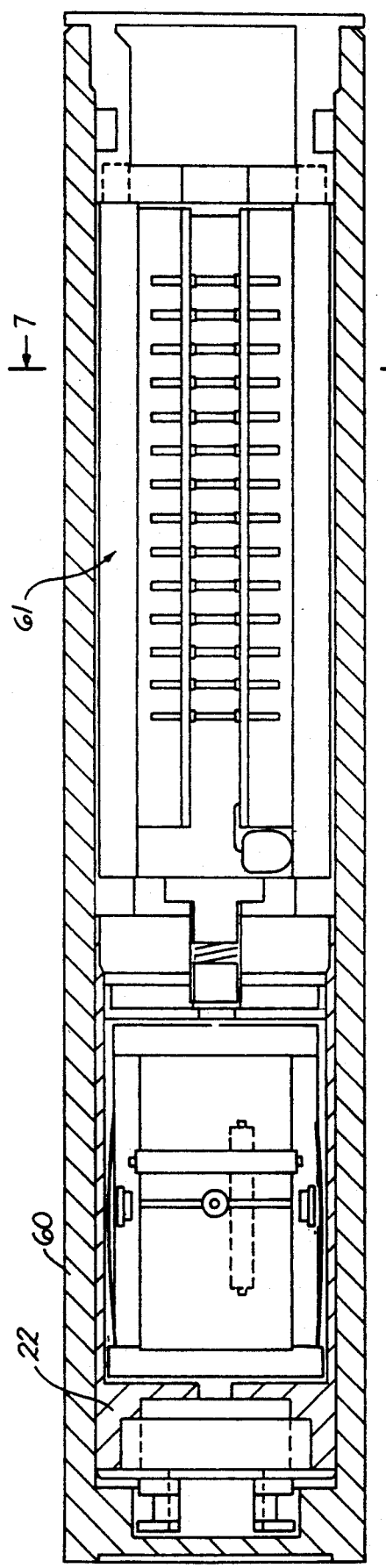
FIG. 6 is a side section view diagrammatic sketch of a magnetic compass system employing the detector unit and other mating electronics in an outer housing shell adapted to be towed behind a vessel through water, for example.
Figure 7:
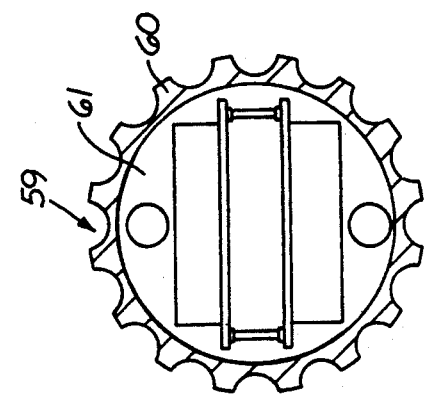
FIG. 7 is an end section view of FIG. 6 taken at lines 7—7.

FIGS. 6 and 7 show the outer titanium, generally cylindrical fluted (59) housing case 60 carrying the inner magnetic compass detection unit 22 and a further electronic section 61 for further system electronics. This overall system is particularly adapted for use within cables towed underseas behind a vessel in a hydrophone streamer performing acoustic measurements.

It is therefore evident that the state of the position detection instrument art is improved by miniaturization and superior performance, particularly under dynamic conditions encountered for example in magnetic compass systems towed in sea water behind vessels. Therefore those novel features representative of the nature and spirit of the invention are defined with particularity in the following claims.

What is claimed is:

1. An electronic magnetic compass system, comprising in combination,
   an electronic circuit assembly,
   a gimbal assembly of two gimbal rings with the circuit assembly mounted therein for dynamically maintaining the orientation of the electronic circuit assembly about a pair of coordinate axes,
   electronic magnetic field detection means in said electronic circuit assembly sensitive to orientation of the circuit assembly with respect to magnetic fields including the earth's magnetic field,
   two conductive metallic pivot shaft portions each electrically insulated from each other, said shafts being aligned along one of said axes for supporting the detection means about that axis for rotation in one of the gimbal rings,
   two electrically conductive gimbal ring members joined by electrical insulation means to form said one of the gimbal rings,
   journalling means in the two isolated gimbal ring members for rotatably journalling the two pivot shafts for rotation therein, said journalling means further comprising ball races having ceramic balls forming electrically non-conductive bearing surfaces between the respective shafts and the respective gimbal ring members, and
   electronic circuit conductor means connected respectively to the two shaft portions and gimbal ring members for communicating electric current signals from the electronic circuit assembly.

2. An electronic magnetic compass system, comprising in combination,
   an electronic circuit assembly,
   a gimbal ring assembly of two gimbal rings with the circuit assembly mounted therein for dynamically maintaining the orientation of the electronic circuit assembly about a pair of coordinate axes,
   electronic magnetic field detection means in said electronic circuit assembly sensitive to orientation of the circuit assembly with respect to magnetic fields including the earth's magnetic field,
   two electrically isolated conductive metallic pivot shafts aligned along one of said axes for supporting the detection means about that axis for rotation in one of the gimbal rings,
   two electrically isolated gimbal ring members joined to form said one of the gimbal rings, journalling means in the two isolated gimbal ring members for rotatably journalling the two pivot shafts for rotation therein, electronic circuit conductor means connected respectively to the two shafts for communicating signals from the electronic circuit assembly, and a pendulum suspended from said detection means to bias the rotation of said circuit assembly about said one axis of rotation by the force of gravity, said pendulum having a central portion and two flanking portions meeting along respective interfaces lying in planes angularly disposed to intersect said axis of rotation, said central portion further having a curved lower surface substantially shaped with a spherical surface, and said flanking portions having lower surfaces substantially shaped with cylindrical surfaces, and wherein the lower surfaces of said central portion and said flanking portions are continuous.

3. The compass system defined in claim I or 2 wherein said circuit conductor means further comprise, electrically conducting leaf spring blades contacting respective ends of the pivot shafts biasing the electronic circuit assembly to resist movements of the center of mass in the gimbal ring.

4. The compass system of claim 1 or 2 wherein one gimbal ring further comprises a substantially cylindrical outer member with a roll detection coil disposed in an indentation extending axially along opposite sides of the cylindrical member.

5. The compass system of claim 1 or 2 wherein an outer gimbal ring assembly is substantially of hollow cylindrical shape and a second said gimbal ring assembly is disposed upon a subassembly removably registered within the housing.

6. The compass system of claim 5 further comprising fluid tight retention members between the two gimbal ring assemblies to form a fluid reservoir within said outer gimbal ring assembly.

7. The compass system of claim 6 with the fluid reservoir filled with a perfluorocarbon oil of a viscosity between lcSt and 10cSt.

8. The compass system of claim 1 or 2 wherein said electronic circuit assembly is mounted on a non-magnetic ceramic substrate, to which said pivot shafts are affixed.

9. The compass system of claim 1 or 2 wherein said two pivot shafts comprise end portions of a metallic shaft of a length to be journalled in said gimbal ring assembly affixed near each of two journalled ends to a substrate for mounting said electronic circuit assembly with an intermediate portion of the shaft removed therefrom.

10. The compass system of claim I or 2 further comprising a substantially cylindrical outer gimbal ring assembly of a diameter less than 2 cm and a length less than 3.8 cm.

11. The compass system of claim 10 further comprising axially oriented indentations in a outer surface of the outer gimbal ring assembly in which a roll detection coil is located.

12. The compass system of claim 1 or 2 in which the shafts have a diameter of about 0.075 cm and said journalling means comprises a ball bearing race with balls having a diameter of about 0.06 cm.

13. The compass system defined in claim 2 wherein said journalling means further comprise ball races having ceramic balls electrically isolating the respective shafts from the respective gimbal ring members.

14. The compass system of claim 2 wherein said pendulum further comprises a flat upper surface and a hollow arm extending from said upper surface and connected to said detection means, said hollow arm further being slotted to reduce eddy currents.

15. The compass system as defined in claim 2 further comprising said pendulum of tungsten.

16. The compass system of claim 2 in which said journalling means comprises ceramic ball bearings.

17. In an electronic magnetic compass system having electronic magnetic field detection means mounted in a gimbal ring assembly and biased by a pendulum swinging about an axis of rotation to position the detection means in a known position related to gravity, said pendulum comprising a central portion and two flanking portions meeting along respective interfaces lying in planes angularly disposed to intersect said axis of rotation, said central portion further having a curved lower surface substantially shaped with a spherical surface, and said flanking portions having lower surfaces substantially shaped with cylindrical surfaces, and wherein the lower surfaces of said flanking portions and said central portion are continuous.

18. The pendulum of claim 17 wherein said pendulum further comprises a flat upper surface and a hollow arm extending from said upper surface and connected to said detection means, said hollow arm further being slotted to reduce eddy currents.

19. In an electronic magnetic compass system having electronic magnetic field detection means carried by an assembly mounted rotatably in a gimbal ring assembly by means of rotatable shaft ends journalled in one gimbal ring, and comprising leaf springs biasing the shaft ends to resist movement of the mass of said electronic detection means axially along the shaft, the improvement comprising a shaft of a length extending between journalled positions in said gimbal ring affixed near opposite ends to an electrically insulating substrate holding said detection means with a portion of the shaft removed after affixing the shaft to the substrate to assure axial alignment of the two shaft ends.

20. In a three-dimensional position detection instrument for detecting a position related to the surface of the earth having a pendulum reference biasing member mounted in a gimbal assembly, the improvement comprising:

a pendulum having a continuous bottom surface comprising a curved spherical central bottom surface portion about an axis of pendulum rotation and a pair of flanking cylindrical bottom surface portions, the flanking portions meeting the central portion along planes intersecting at the pendulum axis of rotation.

21. In a three dimensional position detection instrument for detecting a position related to the surface of the earth having a pendulum reference biasing member mounted in a gimbal assembly, the improvement comprising:

a gimbal ring, an electronic detector circuit assembly mounted on a substrate carried for movement in said gimbal ring by a shaft journalled for rotation therein, said shaft comprising two shaft ends electrically insulated from each other and consisting of electrical circuit connector means for carrying detected signals externally from said circuit assembly.

22. The improvement defined in claim 21 further comprising, gimbal ring structure for electrically isolating the two shaft ends.

23. The improvement defined in claim 21 further comprising, bearing structure electrically isolated from said gimbal ring journalling said shaft ends in said gimbal ring.

24. The improvement defined in claim 23 wherein said bearing structure further comprises ceramic ball bearings.

25. The improvement defined in claim 24, wherein said shaft ends have a diameter in the range of 0.06 cm to 0.09 cm, and said ball bearings have a diameter in the range of 0.04 cm to 0.08 cm.

26. The improvement of claim 21 further comprising respective spring blades resiliently biasing said shaft ends into a position for resisting movement of the mass of said circuit assembly and forming electric connectors to the circuit assembly.

* * * * *